US012731862B2

(12) United States Patent
Zhang et al.

(10) Patent No.: US 12,731,862 B2
(45) Date of Patent: Sep. 8, 2026

(54) SEPARATOR INCLUDING CERAMIC COATING DISPOSED ON BASE LAYER AND BATTERY INCLUDING THE SAME

(71) Applicant: ZHUHAI COSMX BATTERY CO., LTD., Zhuhai (CN)

(72) Inventors: Zulai Zhang, Zhuhai (CN); Suli Li, Zhuhai (CN); Xinping Ai, Zhuhai (CN); Weichao Tang, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 736 days.

(21) Appl. No.: 18/146,598

(22) Filed: Dec. 27, 2022

(65) Prior Publication Data

US 2023/0125852 A1 Apr. 27, 2023

Related U.S. Application Data

(63) Continuation of application No. PCT/CN2021/116800, filed on Sep. 6, 2021.

(30) Foreign Application Priority Data

Sep. 16, 2020 (CN) ......................... 202010975419.4

(51) Int. Cl.
*H01M 50/451* (2021.01)
*H01M 10/0525* (2010.01)
(Continued)

(52) U.S. Cl.
CPC ..... *H01M 50/451* (2021.01); *H01M 10/0525* (2013.01); *H01M 50/417* (2021.01); *H01M 50/42* (2021.01); *H01M 50/434* (2021.01)

(58) Field of Classification Search
CPC ............. H01M 50/451; H01M 50/417; H01M 50/434; H01M 50/42; H01M 10/0525
(Continued)

(56) References Cited

U.S. PATENT DOCUMENTS 7,662,517 B2 2/2010 Lee et al.
9,673,436 B2 6/2017 Ueki et al.
(Continued)

FOREIGN PATENT DOCUMENTS

CN 102437303 A 5/2012
CN 103199209 A 7/2013
(Continued)

OTHER PUBLICATIONS

Extended European Search Report issued in counterpart European Patent Application No. 21868499.1, dated Nov. 21, 2024.
(Continued)

*Primary Examiner* — Sean P Cullen
(74) *Attorney, Agent, or Firm* — Westbridge IP LLC

(57) ABSTRACT

Disclosed are a separator and a battery including the separator. The separator includes a separator base layer and a ceramic coating disposed on a first surface of the separator base layer. The ceramic coating includes ceramic particles. One or more of a surface and an interior of the ceramic coating have micropores. A porosity of the ceramic coating ranges from 40% to 80%. In the micropores, a volume of pores with apertures greater than 0.1 microns occupies 45%-90% of a total pore volume, and a volume of pores with apertures greater than 1.0 micron occupies 40%-80% of the total pore volume. In the present disclosure, a porosity of the separator is improved, and a rate, a residual liquid volume, low-temperature discharging performance, and cycling performance of the battery are improved. In addition, separator
(Continued)

nail penetration strength, self-discharging performance, and safety performance are not affected.

19 Claims, 4 Drawing Sheets

(51) Int. Cl.
*H01M 50/417* (2021.01)
*H01M 50/42* (2021.01)
*H01M 50/434* (2021.01)

(58) Field of Classification Search
USPC ........................................ 429/144, 251, 254
See application file for complete search history.

(56) References Cited

U.S. PATENT DOCUMENTS

2011/0143185 A1* 6/2011 Nishikawa .......... H01M 50/423 429/145
2011/0281150 A1 11/2011 Yong et al.
2015/0179997 A1* 6/2015 Iwai .................... H01M 50/414 429/145
2015/0200388 A1* 7/2015 Yoshitomi ........... H01M 50/489 429/145
2019/0044118 A1* 2/2019 Sakurai ............... H01M 50/491
2019/0319243 A1 10/2019 Yi et al.
2020/0287190 A1* 9/2020 Taguchi ................... B05D 7/04

FOREIGN PATENT DOCUMENTS

CN 103247770 A 8/2013
CN 103947008 A 7/2014
CN 107785522 A * 3/2018 ............ H01M 50/44
CN 110364661 A 10/2019
CN 111224045 A 6/2020
CN 111293262 A 6/2020
CN 112018312 A 12/2020
KR 102050024 B1 11/2019
WO 2019126977 A1 7/2019

OTHER PUBLICATIONS

First Office Action issued in counterpart Chinese Patent Application No. 202010975419.4, dated May 7, 2022.
International Search Report and Written Opinion issued in corresponding PCT Application No. PCT/CN2021/116800, dated Nov. 16, 2021.
Kong et al., Plastic Material, 2017, p. 8, Guangdong Higher Education Press, Guangzhou, dated Jul. 31, 2017.

* cited by examiner

-20°C low-temperature discharging performance

Example 1

Comparative Example 1

4.5
4.3
4.1
3.9
3.7
3.5
3.3
3.1
2.9

Capacity/mAh 0 500 1000 1500 2000 2500 3000 3500

Capacity/mAh

SEPARATOR INCLUDING CERAMIC COATING DISPOSED ON BASE LAYER AND BATTERY INCLUDING THE SAME

CROSS-REFERENCE TO RELATED APPLICATIONS

This Application is a continuation of International Application No. PCT/CN2021/116800, filed on Sep. 6, 2021, which claims priority to Chinese Patent Application No. 202010975419.4, filed on Sep. 16, 2020. The disclosures of the aforementioned disclosures are hereby incorporated by reference in their entireties.

TECHNICAL FIELD

The present disclosure pertains to the field of technologies of lithium-ion batteries, and specifically relates to a separator and a battery including the separator.

BACKGROUND

With the popularity of 3C products and the rise of an electric vehicle market, the requirement for lithium-ion secondary batteries is increasingly high. A separator, as a key component of the lithium-ion secondary battery, directly affects safety performance, rate performance, cycling performance, low-temperature discharging performance, and the like of a lithium-ion secondary battery.

Conventionally, problems of the rate performance, the low-temperature discharging performance, and the cycling performance of the battery are mainly resolved through improving a porosity of a separator base layer (for example, polyethylene or polypropylene). However, as the porosity of the separator base layer increases, performance such as separator nail penetration strength and thermal contraction decreases, and performance such as self-discharging and safety of the battery is affected.

Therefore, it is necessary to provide a separator for resolving the problems of the rate performance, the low-temperature discharging performance, and the cycling performance of the battery without affecting the self-discharging performance and the safety performance of a battery.

SUMMARY

To improve deficiencies in the prior art, an object of the present disclosure is to provide a separator and a battery including the separator. The separator includes a separator base layer and a ceramic coating disposed on a surface of the separator base layer. A large quantity of micropores are formed in a surface and/or an interior of the ceramic coating. In this way, a porosity of the separator can be improved, to improve a rate, a residual liquid volume, low-temperature discharging performance, and cycling performance of the battery. In addition, separator nail penetration strength, self-discharging performance, and safety performance may be ensured.

The object of the present disclosure is achieved by using the following technical solutions:

A separator is provided. The separator includes a separator base layer and a ceramic coating disposed on a first surface of the separator base layer. The ceramic coating includes ceramic particles. One or more of a surface and an interior of the ceramic coating have micropores. A porosity of the ceramic coating ranges from 40% to 80%. In the micropores, a volume of pores with apertures greater than 0.1 microns occupies 45%-90% of a total pore volume, and a volume of pores with apertures greater than 1.0 micron occupies 40%-80% of the total pore volume.

According to the present disclosure, the volume of the pores with the apertures greater than 0.1 microns occupies 45%-90% of the total pore volume, for example, 45%, 50%, 55%, 60%, 65%, 70%, 75%, 80%, 85%, or 90% of the total pore volume; and the volume of the pores with the apertures greater than 1.0 micron occupies 40%-80% of the total pore volume, for example, 40%, 45%, 50%, 55%, 60%, 65%, 70%, 75%, or 80% of the total pore volume.

According to the present disclosure, an aperture of the largest pore in the micropores does not exceed 10 microns.

According to the present disclosure, an aperture of the smallest pore in the micropores is not less than 0.01 microns.

According to the present disclosure, a total surface density of the separator ranges from 9.4 $g/m^2$ to 10.0 $g/m^2$.

According to the present disclosure, a material system of the separator base layer is selected from at least one of polyethylene, polypropylene, polyethylene terephthalate, polybutylene terephthalate, polystyrene, a polynaphthalene system polymer, polyimide, polyamide, aromatic polyamide fiber, or poly (p-phenylenebenzobisoxazole).

According to the present disclosure, a porosity of the separator base layer ranges from 20% to 80%. For example, the porosity of the separator base layer is 20%, 30%, 40%, 50%, 60%, 70% or 80%.

According to the present disclosure, a thickness of the separator base layer ranges from 5 μm to 50 μm. For example, the thickness of the separator base layer is 5 μm, 10 μm, 15 μm, 20 μm, 25 μm, 30 μm, 40 μm, or 50 μm.

According to the present disclosure, an addition amount of the ceramic particles is 80 wt %-97 wt % of a total mass of the ceramic coating, for example, 80 wt %, 82 wt %, 85 wt %, 88 wt %, 90 wt %, 92 wt %, 94 wt %, 95 wt %, 96 wt %, or 97 wt %.

According to the present disclosure, the ceramic coating further includes an additive. The additive includes a binder, a thickener, and a dispersing agent.

According to the present disclosure, an addition amount of the binder is 1 wt %-10 wt % of the total mass of the ceramic coating, for example, 1 wt %, 2 wt %, 3 wt %, 4 wt %, 5 wt %, 6 wt %, 7 wt %, 8 wt %, 9 wt %, or 10 wt %.

An addition amount of the thickener is 1 wt %-10 wt % of the total mass of the ceramic coating, for example, 1 wt %, 2 wt %, 3 wt %, 4 wt %, 5 wt %, 6 wt %, 7 wt %, 8 wt %, 9 wt %, or 10 wt %.

An addition amount of the dispersing agent is 1 wt %-5 wt % of the total mass of the ceramic coating, for example, 1 wt %, 2 wt %, 3 wt %, 4 wt %, or 5 wt %.

According to the present disclosure, the binder is selected from at least one of polytetrafluoroethylene, polyvinylidene fluoride, copolymerized modified poly(vinylidene fluoride-co-hexafluoropropylene), polyimide, polyacrylonitrile, poly (methyl methacrylate), aramid resin, polyacrylic acid, styrene-butadiene rubber (SBR), polyvinyl alcohol and copolymerized modified polyvinyl alcohol, polyvinyl acetate, polyacrylamide, phenol formaldehyde resin, epoxy resin, water-based polyurethane, ethylene-vinyl acetate copolymer, multicomponent acrylic copolymer, polystyrene lithium sulfonate, water-based organic silicone resin, butyronitrile-polyvinyl chloride blend, polyethylene oxide, styrene-acrylic latex, or benzene latex.

According to the present disclosure, the thickener is selected from at least one of benzyl butyl phthalate compound, sodium carboxymethyl cellulose, cellulose derivative, polyurethane, acrylate, or lithium carboxymethyl cellulose.

According to the present disclosure, the dispersing agent is selected from at least one of polyvinylpyrrolidone, polyethylene glycol, sodium polyacrylate, sodium silicate, polypropylene alcohol, or triammonium citrate.

According to the present disclosure, a large quantity of micropores exist in the surface and/or the interior of the ceramic coating. Formation of the micropores is adding thermosensitive polymer to slurry for preparing the ceramic coating, then performing heat treatment through a drying process.

The thermosensitive polymer is fused and then separated from a system in a heat treatment process, and a large quantity of micropores are formed in the surface and/or the interior of the ceramic coating.

The thermosensitive polymer is selected from at least one of polyethylene, polystyrene, poly(methyl methacrylate), poly(acrylic acid-co-butadiene-co-styrene), polylactic acid, polyvinyl chloride, polyvinyl butyral, a monomer-modified copolymerized polymer thereof, or the like.

The thermosensitive polymer is preferably thermosensitive polymer microspheres. A particle size of the thermosensitive polymer microsphere ranges from 0.01 μm to 10 μm.

A melting point of the thermosensitive polymer ranges from 60° C. to 150° C.

The ceramic particle is selected from one or more of aluminium oxide, boehmite, magnesium oxide, magnesium hydroxide, barium sulfate, barium titanate, zinc oxide, calcium oxide, silicon dioxide, silicon carbide, and nickel oxide.

A weight ratio of the thermosensitive polymer to the ceramic particles is (1-60):(99-40) in the slurry for preparing the ceramic coating, for example, (5-50):(95-50), (10-45):(90-55), (15-40):(85-60), or (20-30):(80-70).

According to the present disclosure, the separator may be used in the field of lithium-ion batteries.

According to the present disclosure, a thickness of the ceramic coating ranges from 1 μm to 10 μm, for example, from 2 μm to 5 μm. For example, the thickness of the ceramic coating is 1 μm, 2 μm, 3 μm, 4 μm, 5 μm, 6 μm, 7 μm, 8 μm, 9 μm, or 10 μm. The ceramic coating with the thickness may be obtained through one time of coating, or may be obtained through a plurality of times of coating.

According to the present disclosure, a median particle size of the ceramic particles ranges from 0.01 μm to 10 μm. For example, the average particle size of the ceramic particles is 0.01 μm, 0.05 μm, 0.1 μm, 0.5 μm, 1 μm, 4 μm, 5 μm, 8 μm, or 10 μm.

According to the present disclosure, the separator further includes a first binder coating layer disposed on a surface of the ceramic coating.

According to the present disclosure, the separator further includes a second binder coating layer disposed on a second surface, opposite to a first surface, of the separator base layer.

According to the present disclosure, the first binder coating layer and the second binder coating layer have a same thickness or different thicknesses selected from a range of 1 μm-5 μm.

According to the present disclosure, a material system of the binder coating layer is selected from polytetrafluoroethylene, polyvinylidene fluoride, copolymerized modified poly(vinyli dene fluoride-co-hexafluoropropylene), polyimide, polyacrylonitrile, poly(methyl methacrylate), aramid resin, polyacrylic acid, styrene-butadiene rubber (SBR), polyvinyl alcohol and copolymerized modified polyvinyl alcohol, polyvinyl acetate, polyacrylamide, phenol formaldehyde resin, epoxy resin, water-based polyurethane, ethylene-vinyl acetate copolymer, multicomponent acrylic copolymer, polystyrene lithium sulfonate, water-based organic silicone resin, butyronitrile-polyvinyl chloride blend, polyethylene oxide, styrene-acrylic latex, or benzene latex.

The present disclosure further provides a method for preparing the foregoing separator. The method includes the following steps:

(a) Mixing the ceramic particles, water, and an optional additive to obtain ceramic slurry.

(b) Adding the thermosensitive polymer to the ceramic slurry obtained in Step (a) to obtain modified ceramic slurry.

(c) Coating the first surface of the separator base layer with the modified ceramic slurry obtained in Step (b), and preparing the separator after drying and heat treatment.

According to the present disclosure, the method further includes the following step:

(d) Preparing slurry for forming the binder coating layer, and coating the second surface of the separator base layer, and/or the surface of the ceramic coating with the slurry of the binder coating layer.

According to the present disclosure, a mass ratio of the ceramic particles to the additive is (80-97):(3-20) in Step (a).

According to the present disclosure, the additive includes a binder, a thickener, and a dispersing agent in Step (a).

According to the present disclosure, a mass ratio of the thermosensitive polymer to the ceramic particles is (1-60):(99-40) in Step (b).

According to the present disclosure, a coating manner is, for example, spraying, dip coating, intaglio printing, extrusion coating, or transfer coating in Step (c).

According to the present disclosure, in Step (c), a drying temperature ranges from 40° C. to 120° C., and a drying time ranges from 20 s to 600 s. A heat treatment temperature is 0° C.-20° C. higher than the melting point of the thermosensitive polymer, and a heat treatment time ranges from 2 min to 10 min.

The present disclosure further provides a lithium-ion battery. The lithium-ion battery includes the foregoing separator.

According to the present disclosure, the lithium-ion battery further includes a positive electrode, a negative electrode, and an electrolyte.

The present disclosure has the following beneficial effects:

The present disclosure provides a separator and a battery including the separator. According to the present disclosure, a large quantity of micropores are formed in a surface and/or an interior of a ceramic coating. In this way, a porosity of the separator is improved, and a rate of the battery, a residual liquid volume, low-temperature discharging performance, and long cycling performance are improved. In addition, it is ensured that separator nail penetration strength performance, self-discharging performance, and safety performance are not affected.

DETAILED DESCRIPTION OF THE EMBODIMENTS

Figure 1:
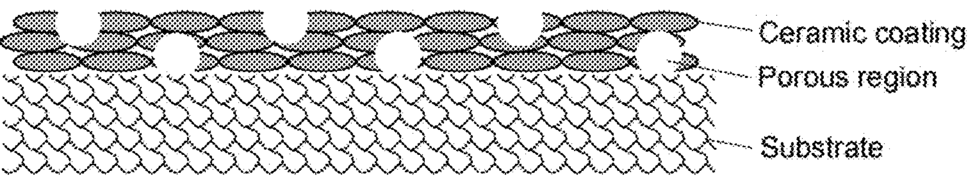
FIG. 1 is a schematic diagram of a structure of a separator according to an implementation of the present disclosure.
Figure 2:
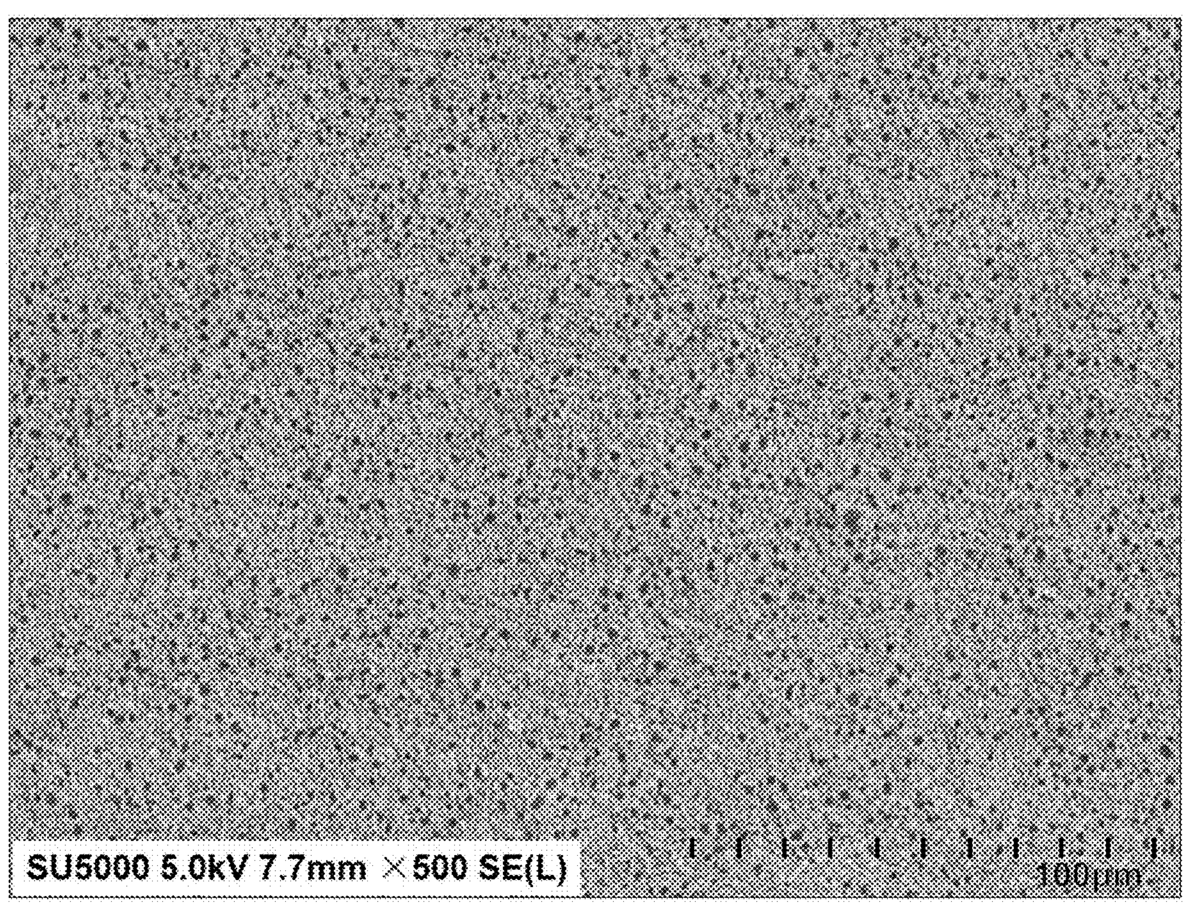
FIG. 2 is a scanning electron microscope image (500×) of a ceramic coating in a separator of Example 1.
Figure 3:
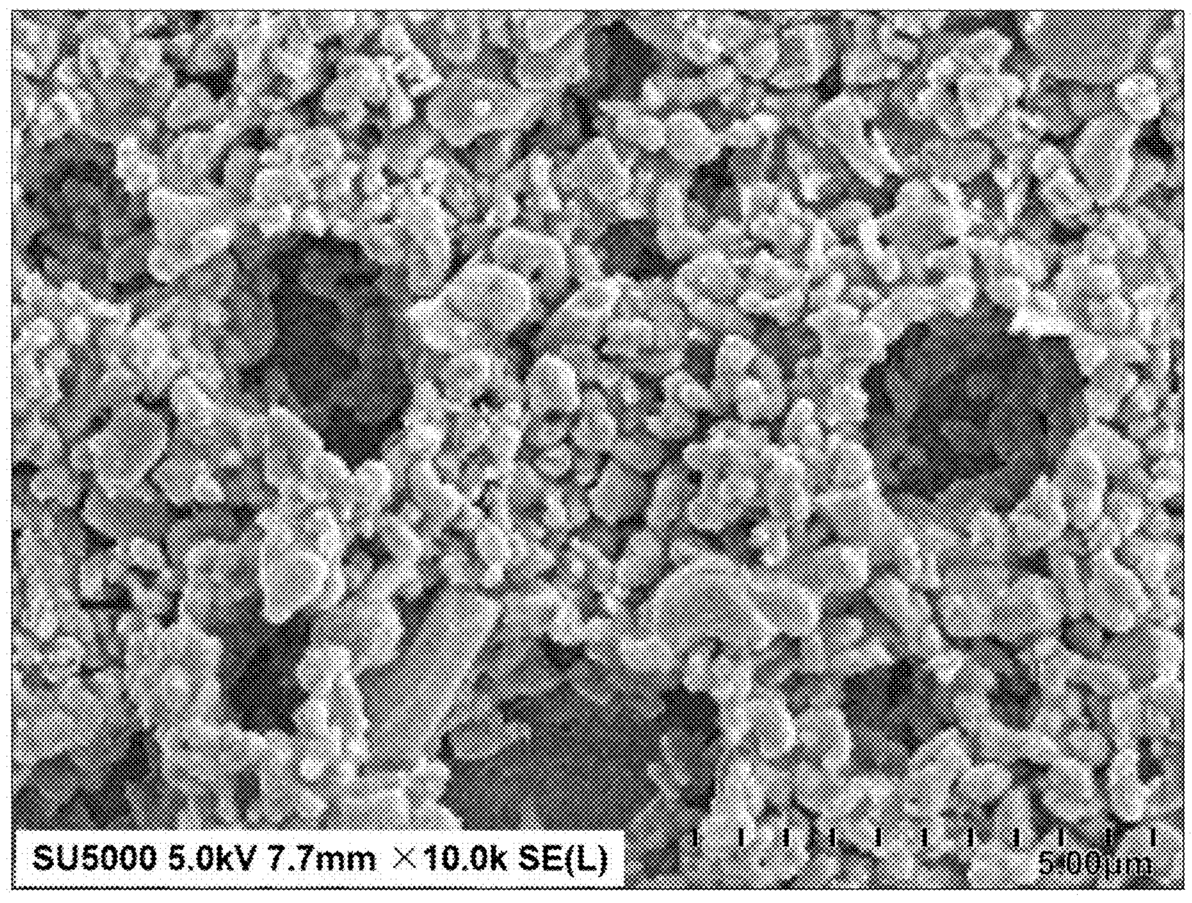
FIG. 3 is a scanning electron microscope image (10000×) of a ceramic coating in a separator of Example 1.

The present disclosure is further described in detail with reference to specific embodiments below. It should be understood that the following embodiments merely illustrate and explain an example of the present disclosure, and should not be construed as limiting the protection scope of the present disclosure. All technologies implemented based on the foregoing content of the present disclosure are within the protection scope of the present disclosure.

Experimental methods used in the following examples are all conventional methods unless otherwise specified, and reagents, materials, and the like that are used in the following examples may be all obtained from commercial sources unless otherwise specified.

EXAMPLE 1

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.2 kg thermosensitive polymer microspheres (a particle size of the thermosensitive polymer microsphere is 1.5 μm, and a thermosensitive temperature is 110° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 120° C. for 5 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 55%. Pores with apertures greater than 0.1 μm occupy 85%, and pores with apertures greater than 1 μm occupy 45%. A total surface density of the separator is 10.0 $g/m^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 2

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.4 kg thermosensitive polymer microspheres (a particle size of the thermosensitive polymer microsphere is 1.5 μm, and a thermosensitive temperature is 110° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 122° C. for 5 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 63%. Pores with apertures greater than 0.1 μm occupy 87%, and pores with apertures greater than 1 μm occupy 55%. A total surface density of the separator is 9.7 $g/m^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 3

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.6 kg thermosensitive polymer microspheres (a particle size of the thermosensitive polymer microsphere is 1.5 μm, and a thermosensitive temperature is 110° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 124° C. for 5 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 70%. Pores with apertures greater than 0.1 μm occupy 89%, and pores with apertures greater than 1 μm occupy 65%. A total surface density of the separator is 9.4 $g/m^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 4

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.4 kg thermosensitive polymer microspheres (a particle size of the thermosensitive polymer microsphere is 1.0 μm, and a thermosensitive temperature is 110° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 120° C. for 7 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 60%. Pores with apertures greater than 0.1 μm occupy 88%, and pores with apertures greater than 1 μm occupy 50%. A total surface density of the separator is 9.8 g/m$^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 5

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.6 kg thermosensitive polymer microspheres (a particle size of the thermosensitive polymer microsphere is 0.5 μm, and a thermosensitive temperature is 110° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 118° C. for 9 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 72%. Pores with apertures greater than 0.1 μm occupy 90%, and pores with apertures greater than 1 μm occupy 55%. A total surface density of the separator is 9.5 g/m$^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 6

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.2 kg thermosensitive polymer microspheres (a particle size of the thermosensitive polymer microsphere is 1.0 μm, and a thermosensitive temperature is 100° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 120° C. for 7 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 55%. Pores with apertures greater than 0.1 μm occupy 85%, and pores with apertures greater than 1 μm occupy 40%. A total surface density of the separator is 10.0 g/m$^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

EXAMPLE 7

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

0.2 kg thermosensitive polymer microspheres (a particle size of the thermosensitive polymer microsphere is 1.0 μm, and a thermosensitive temperature is 120° C.) were added to 10 kg of the foregoing ceramic slurry to obtain modified ceramic slurry.

Microgravure coating was performed on a first surface of a separator base layer by using the foregoing modified ceramic slurry, followed by drying at 60° C. for 1 min and processing at a high temperature of 130° C. for 4 min, to obtain a separator.

A thickness of the separator base layer in the separator is 9 μm. A material system of the separator base layer is PE. A porosity is 40%.

A thickness of a ceramic coating in the separator is 3 μm. One or more of a surface and an interior of the ceramic coating have micropores. A porosity of the ceramic coating is 55%. Pores with apertures greater than 0.1 μm occupy 85%, and pores with apertures greater than 1 μm occupy 40%. A total surface density of the separator is 10.0 g/m$^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

Comparative Example 1

20 kg aluminium oxide, 0.32 kg sodium carboxymethyl cellulose, 1 kg poly(methyl methacrylate), 0.1 kg polyvinylpyrrolidone, and 78.58 kg deionized water were mixed together to obtain ceramic slurry.

Microgravure coating was performed on a first surface of a separator base layer by using the foregoing modified ceramic slurry, followed by drying at 60° C. for 1 min, to obtain a separator.

A thickness of the separator base layer in the separator is 9 μm. A material system of the separator base layer is PE. A porosity is 40%.

A thickness of a ceramic coating in the separator is 3 One or more of a surface and an interior of the ceramic coating have micropores. A porosity of the ceramic coating is 30%. Pores with apertures greater than 0.1 μm occupy 60%, and pores with apertures greater than 1 μm occupy 15%. A total surface density of the separator is 10.0 g/m$^2$.

A lithium-ion battery cell was prepared by using a method such as stacking or winding the foregoing separator, a positive electrode, and a negative electrode. A lithium-ion battery with high performance was obtained after baking, electrolyte filling, formation, and packaging.

Test Example 1

A voltage test and an internal resistance test were performed on the lithium-ion batteries prepared in Examples 1 to 7 and Comparative Example 1. A test process was as follows: the lithium-ion batteries prepared in Examples 1 to 7 and Comparative Example 1 were fully charged and then placed in an environment at 25° C. in 50% humidity. A voltage and internal resistance meter (Applent-Applent, Model: AT526B) was used to test a voltage and an internal resistance of the battery in a fully charged state. Results are shown in Table 1.

TABLE 1

Results of the voltage test and internal resistance test for the lithium-ion batteries in Examples 1 to 7 and Comparative Example 1

| Sample number | Average voltage of the lithium-ion battery | Internal resistance of the lithium-ion battery |
|---|---|---|
| Example 1 | 4.2011 V | 10.23 mΩ |
| Example 2 | 4.2022 V | 9.67 mΩ |
| Example 3 | 4.2017 V | 8.42 mΩ |
| Example 4 | 4.2015 V | 9.88 mΩ |
| Example 5 | 4.2009 V | 7.75 mΩ |
| Example 6 | 4.2012 V | 10.33 mΩ |
| Example 7 | 4.2022 V | 10.28 mΩ |
| Comparative Example 1 | 4.2015 V | 12.55 mΩ |

It is learned from data in Table 1 that, after the lithium-ion batteries prepared in Examples 1 to 7 and Comparative Example 1 are sorted, the voltages are normal. However, internal resistances of the lithium-ion batteries prepared in Examples 1 to 7 are significantly reduced in comparison with that of the lithium-ion battery prepared in Comparative Example 1. This is mainly because permeability of lithium ions can be significantly improved due to high porosities of the separators prepared in Examples 1 to 7. In addition, significant reduction in the internal resistance also helps improve rate performance, low-temperature discharging performance, and long cycling performance of the battery.

Figure 4:
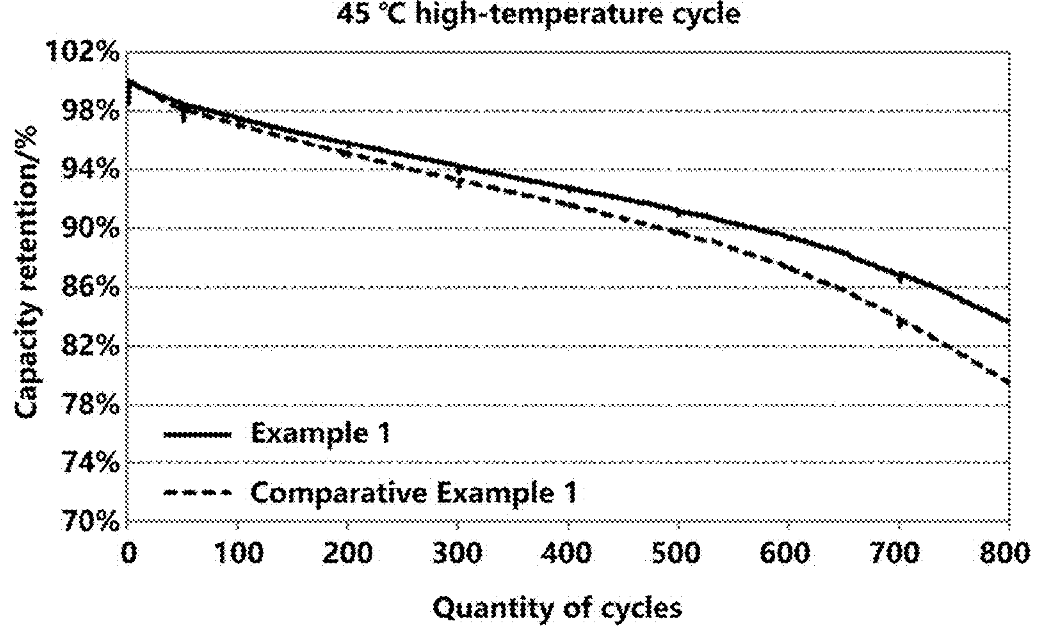
FIG. 4 is a 45° C. cyclic graph of batteries with prepared separators in Example 1 and Comparative Example 1.
Figures 5, 6:
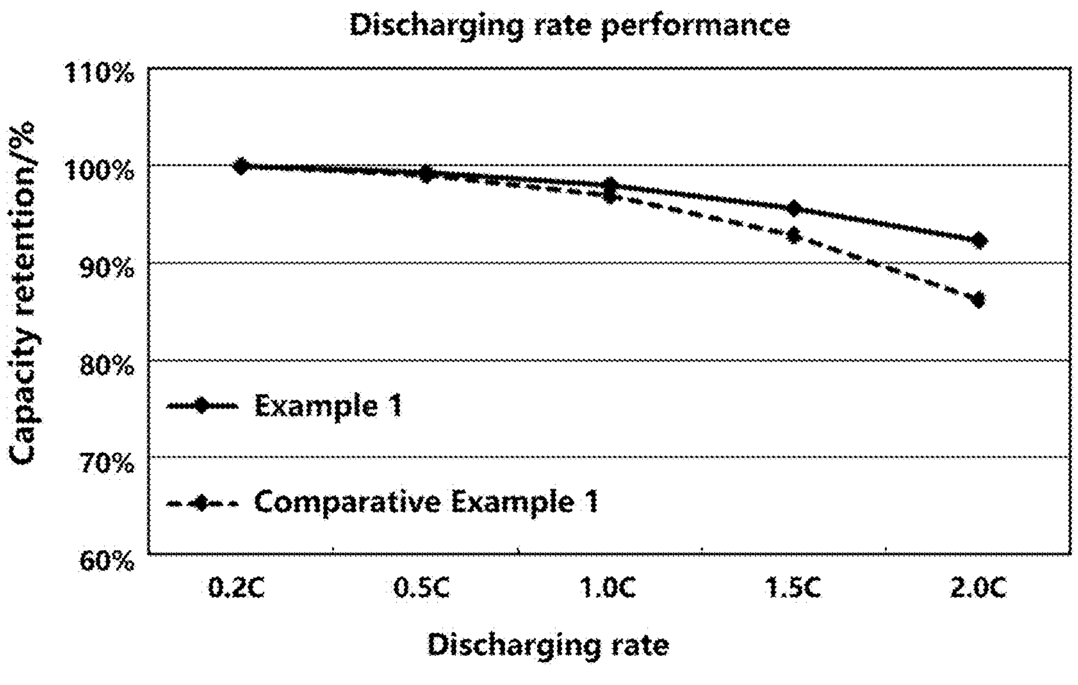
FIG. 5 is a diagram of rate discharging of batteries with prepared separators in Example 1 and Comparative Example 1.
FIG. 6 is a diagram of discharging of batteries with prepared separators at a low temperature of −20° C. in Example 1 and Comparative Example 1.
Figure 7:
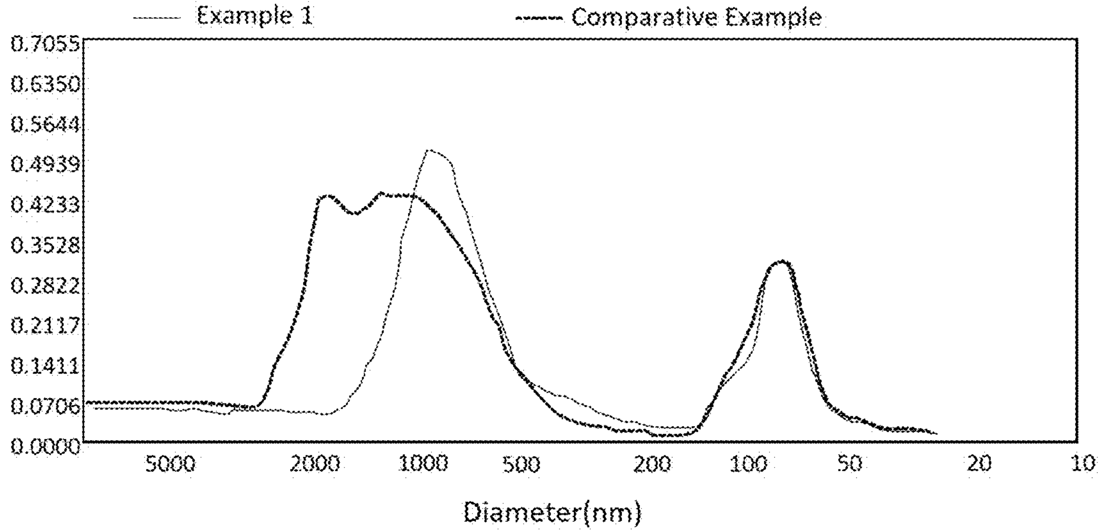
FIG. 7 is a diagram of aperture distribution of separators in Example 1 and Comparative Example 1.

Details for the tests are as follows:

A charge-discharge cycle test and a rate performance test were performed on the lithium-ion batteries prepared in Example 1 and Comparative Example 1. The charge-discharge cycle test was performed by using a 1C charging system/a 1C discharging system. The rate performance test was performed by using a 0.2C charging system/a 0.2C, 0.5C, 1C, 1.5C, or 2C discharging system. Results are shown in FIG. 4 and FIG. 5. It may be learned from FIG. 4 and FIG. 5 that the battery in Example 1 may maintain a good capacity retention in a latter period of the cycle and may also maintain a good capacity retention during high rate discharging.

Experimental results of Examples 1 to 7 and Comparative Example 1 are compared to obtain the following conclusions:

(1) As the porosity of the ceramic coating increases, the internal resistance of the battery can be reduced, and the rate performance and the cycling performance of the battery can be improved.

(2) In Examples 1 to 7, as the porosity increases, the internal resistance of the battery is significantly decreased.

Test Example 2

Residual liquid volumes of the lithium-ion batteries prepared in Examples 1 to 7 and Comparative Example 1 were tested. A separator nail penetration strength and an ionic conductivity were tested for the separators of the lithium-ion batteries prepared in Examples 1 to 7 and Comparative Example 1.

The residual liquid volume was mainly obtained through measuring a weight M1 of a battery cell before electrolyte filling, an edge trimming weight M2, and a weight M3 of the cell after a second time of packaging, to obtain the residual liquid volume M3+M2−M1. A method for measuring the nail penetration strength was as follows: penetrating the separator at a speed of 100 mm/min by using a steel nail including a spherical nail head with a diameter of 1 mm. In a penetration process, a maximum force was recorded as the nail penetration strength. A method for testing the ionic conductivity was as follows: placing a sample into an electrolyte at a temperature of 23±2° C., to keep sealed and soaked for 2 h; injecting the electrolyte into a resistance test mold, connecting the resistance test mold to a chemical workstation, and setting test parameters; placing one layer of a separator and testing impedance spectroscopy of this layer, placing another layer and testing impedance spectroscopy of this layer until four layers are placed, obtaining four impedance spectroscopy images through measurement, and separately reading resistance values R1, R2, R3, and R4 of the first layer to the fourth layer from the impedance spectroscopy images; and drawing a curve by using a layer number as a horizontal coordinate and a separator resistance value as a vertical coordinate, and obtaining a slope and a linear fitting degree of the curve. When the linear fitting degree is greater than 0.99, the ionic conductivity of the separator is calculated according to the following formula:

$$\sigma = d/1000kS$$

In the formula:

σ denotes an ionic conductivity of a sample in units of siemens/centimeter (S/cm), d denotes a thickness of a sample in units of microns (μm), k denotes a slope of a curve, and S denotes a test area of a separator in units of square centimeters ($cm^2$).

TABLE 2

Test results of residual liquid volumes, separator nail penetration strengths of the separators, and ionic conductivities of the lithium-ion batteries prepared in Examples 1 to 7 and Comparative Example 1

| | Residual liquid volume *g | Ionic conductivity $*10^{-4}Scm^{-1}$ | Separator nail penetration strength g |
|---|---|---|---|
| Example 1 | 7.978 | 10.66 | 528 |
| Example 2 | 8.109 | 12.45 | 535 |
| Example 3 | 8.411 | 13.74 | 510 |
| Example 4 | 8.045 | 11.98 | 518 |
| Example 5 | 8.604 | 15.79 | 507 |
| Example 6 | 7.898 | 10.53 | 502 |
| Example 7 | 7.935 | 9.86 | 498 |
| Comparative Example 1 | 7.503 | 3.64 | 511 |

It may be learned from the test results that the residual liquid volumes in the separators of Examples 1 to 7 are improved to some extent. This is mainly because the porosity of the separator increases, and there is more space for storing the electrolyte. In addition, ionic conductivities of the separators in Examples 1 to 7 are significantly increased. This is mainly because the porosity of the ceramic coating made of a porous material is significantly increased. Therefore, it may also be indicated that long cycling performance, rate performance, and low temperature performance of the battery may be significantly improved because of the separators in Examples 1 to 7. The nail penetration strength test performed on the separators in Examples 1 to 7 has equivalent results as the nail penetration strength test performed on the separator in Comparative Example 1. This indicates that the separator in the present disclosure may meet a requirement for the nail penetration strength, and a relatively good safety performance is obtained.

The implementations of the present disclosure are described above. However, the present disclosure is not limited to the foregoing implementations. Any modification, equivalent replacement, or improvement made without departing from the spirit and the principle of the present disclosure shall fall within the protection scope of the present disclosure.

What is claimed is:

1. A separator, comprising a separator base layer and a ceramic coating disposed on a first surface of the separator base layer; wherein the ceramic coating comprises ceramic particles;

a surface and/or an interior of the ceramic coating has micropores;

a porosity of the ceramic coating ranges from 40% to 80%;

in the micropores, a volume of pores with apertures greater than 0.1 microns occupies 55%-90% of a total pore volume;

a volume of pores with apertures greater than 1.0 micron occupies 40%-80% of the total pore volume; and an aperture of a largest pore in the micropores does not exceed 10 microns, and an aperture of a smallest pore in the micropores is not less than 0.01 microns.

2. The separator according to claim 1, wherein a total surface density of the separator ranges from 9.4 $g/m^2$ to 10.0 $g/m^2$.

3. The separator according to claim 1, wherein a material system of the separator base layer is selected from at least one of polyethylene, polypropylene, polyethylene terephthalate, polybutylene terephthalate, polystyrene, a polynaphthalene system polymer, polyimide, aromatic polyamide fiber, or poly (p-phenylenebenzobisoxazole).

4. The separator according to claim 1, wherein a porosity of the separator base layer ranges from 20% to 80%; and/or a thickness of the separator base layer ranges from 5 μm to 50 μm.

5. The separator according to claim 1, wherein a thickness of the ceramic coating ranges from 1 μm to 10 μm.

6. The separator according to claim 1, wherein a median particle size of the ceramic particles ranges from 0.01 μm to 10 μm.

7. The separator according to claim 1, wherein an addition amount of the ceramic particles is 80 wt %-97 wt % of a total mass of the ceramic coating.

8. The separator according to claim 1, wherein the ceramic coating further comprises an additive, and the additive comprises a binder, a thickener, and a dispersing agent.

9. The separator according to claim 8, wherein an addition amount of the binder is 1 wt %-10 wt % of the total mass of the ceramic coating, an addition amount of the thickener is 1 wt %-10 wt % of the total mass of the ceramic coating, and an addition amount of the dispersing agent is 1 wt %-5 wt % of the total mass of the ceramic coating.

10. The separator according to claim 1, wherein the ceramic coating is obtained by using the following preparation method:

adding a thermosensitive polymer to a slurry for preparing the ceramic coating, and then obtaining the ceramic coating after drying and heat treatment.

11. The separator according to claim 10, wherein the thermosensitive polymer is selected from at least one of polyethylene, polystyrene, poly (methyl methacrylate), poly (acrylic acid-co-butadiene-co-styrene), polylactic acid, polyvinyl chloride, polyvinyl butyral, or a monomer-modified copolymerized polymer thereof.

12. The separator according claim 10, wherein the thermosensitive polymer is thermosensitive polymer microspheres, and a particle size of the thermosensitive polymer microsphere ranges from 0.01 μm to 10 μm, and/or a melting point of the thermosensitive polymer ranges from 60° C. to 150° C.

13. The separator according claim 10, wherein a drying temperature ranges from 40° C. to 120° C., and a drying time ranges from 20 s to 600 s.

14. The separator according to claim 10, wherein a heat treatment temperature is 0° C.-20° C. higher than a melting point of the thermosensitive polymer, and a heat treatment time ranges from 2 min to 10 min.

15. The separator according to claim 10, wherein a weight ratio of the thermosensitive polymer to the ceramic particles is (1-60):(99-40) in the slurry for preparing the ceramic coating.

16. The separator according to claim 1, wherein the separator further comprises a first binder coating layer disposed on the surface of the ceramic coating.

17. The separator according to claim 16, wherein the separator further comprises a second binder coating layer disposed on a second surface, opposite to a first surface, of the separator base layer.

18. The separator according to claim 17, wherein the first binder coating layer and the second binder coating layer have a same thickness or different thicknesses selected from a range of 1 μm-5 μm.

19. A lithium-ion battery, wherein the lithium-ion battery comprises the separator according to claim 1.

* * * * *